United States Patent
Choi et al.

(10) Patent No.: US 10,986,578 B2
(45) Date of Patent: *Apr. 20, 2021

(54) SYSTEMS AND METHODS FOR PROVIDING COMMUNICATIONS WITH AN IMPROVED NETWORK FRAME STRUCTURE ARCHITECTURE WITHIN WIRELESS SENSOR NETWORKS

(71) Applicant: LOCIX Inc., San Bruno, CA (US)

(72) Inventors: Soon Hyeok Choi, Cupertino, CA (US); Tommi Ylamurto, Los Gatos, CA (US)

(73) Assignee: LOCIX, INC., San Bruno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,384

(22) Filed: Jul. 24, 2019

(65) Prior Publication Data

US 2019/0349859 A1  Nov. 14, 2019

Related U.S. Application Data

(63) Continuation of application No. 15/684,894, filed on Aug. 23, 2017, now Pat. No. 10,397,872.

(51) Int. Cl.
*H04W 52/02* (2009.01)
*H04B 1/58* (2006.01)
(Continued)

(52) U.S. Cl.
CPC ...... *H04W 52/0235* (2013.01); *G06F 13/372* (2013.01); *H04B 1/583* (2013.01);
(Continued)

(58) Field of Classification Search
CPC ............ H04B 1/583; H04B 1/56; H04B 1/58; H04W 28/04; H04W 72/042;
(Continued)

(56) References Cited

U.S. PATENT DOCUMENTS 7,969,928 B2 * 6/2011 Chiricescu ........ H04W 52/0277
370/318
9,529,076 B2 * 12/2016 Subramanian ............ G01S 5/10
(Continued)

FOREIGN PATENT DOCUMENTS

WO  2017030362 A1  2/2017
WO  2019040559     2/2019

OTHER PUBLICATIONS

Notice of Publication for CN2018800550169 (Pub. No. CN111066352A), 4 pages, Apr. 24, 2020.
(Continued)

*Primary Examiner* — Man U Phan
(74) *Attorney, Agent, or Firm* — Jaffery Watson Mendonsa & Hamilton LLP

(57) ABSTRACT

Systems and methods for providing communications with an improved network frame structure within wireless sensor networks are disclosed herein. In one embodiment, a system includes a hub having one or more processing units and RF circuitry for transmitting and receiving communications in a wireless network architecture. The system also includes a plurality of sensor nodes each having a wireless device with a transmitter and a receiver to enable bi-directional communications with the hub in the wireless network architecture. The one or more processing units of the hub are configured to execute instructions to cause a change from a first power mode of a receiver of a sensor node to a second power mode upon transmitting notifications to the sensor node during a repeated hub broadcasting time slot.

20 Claims, 13 Drawing Sheets

(51) Int. Cl.
*G06F 13/372* (2006.01)
*H04W 72/04* (2009.01)
*H04W 28/04* (2009.01)
*H04B 1/56* (2006.01)
*H04W 84/18* (2009.01)

(52) U.S. Cl.
CPC .......... *H04W 72/0446* (2013.01); *H04B 1/56* (2013.01); *H04W 28/04* (2013.01); *H04W 72/042* (2013.01); *H04W 72/0413* (2013.01); *H04W 84/18* (2013.01)

(58) Field of Classification Search
CPC ......... H04W 72/0446; H04W 52/0235; H04W 72/0413; H04W 84/18; H04W 52/02; H04W 72/04; G06F 13/372
USPC ........................................................ 370/311
See application file for complete search history.

(56) References Cited

U.S. PATENT DOCUMENTS

| | | | | |
|---|---|---|---|---|
| 9,706,489 | B2* | 7/2017 | Subramanian | H04W 74/085 |
| 9,801,137 | B2* | 10/2017 | Ree | H04W 52/0219 |
| 10,028,220 | B2 | 7/2018 | Subramaniam | |
| 10,156,852 | B2* | 12/2018 | Bakhishev | G01C 21/00 |
| 10,231,233 | B2* | 3/2019 | Matsuo | H04W 72/0446 |
| 10,250,955 | B2* | 4/2019 | Schwartz | H04Q 9/00 |
| 10,397,872 | B2* | 8/2019 | Choi | H04W 72/0446 |
| 10,504,364 | B2* | 12/2019 | Bakhishev | G06K 9/6227 |
| 10,514,704 | B2* | 12/2019 | Bakhishev | H04W 4/021 |
| 10,638,476 | B2* | 4/2020 | Matsuo | H04W 72/0446 |
| 2005/0141465 | A1 | 6/2005 | Kato | |
| 2008/0049700 | A1* | 2/2008 | Shah | H04W 52/0225 370/342 |
| 2010/0150048 | A1 | 6/2010 | Chia-Hung et al. | |
| 2012/0119902 | A1 | 5/2012 | Patro | |
| 2013/0314229 | A1 | 11/2013 | Tu | |
| 2015/0249928 | A1 | 9/2015 | Jorge et al. | |
| 2016/0198244 | A1 | 7/2016 | Lund | |
| 2017/0094602 | A1 | 3/2017 | Dinh et al. | |
| 2017/0192435 | A1* | 7/2017 | Bakhishev | G05D 1/028 |
| 2018/0059678 | A1* | 3/2018 | Bakhishev | G05D 1/028 |
| 2018/0139517 | A1* | 5/2018 | Schwartz | H02J 50/20 |

OTHER PUBLICATIONS

Notice of Publication for EP18847984.4 (Pub. No. 3669596), 3 pages, Jun. 24, 2020.
International Preliminary Report for PCT Application No. PCT/US2018/047423, 11 pages, dated Mar. 5, 2020.
Notice of Allowance received for U.S. Appl. No. 15/684,894, 9 pages, dated Apr. 10, 2019.
International Search Report and Written Opinion received for International Application No. PCT/US2018/047423, dated Nov. 28, 2018, 16 pages.

\* cited by examiner

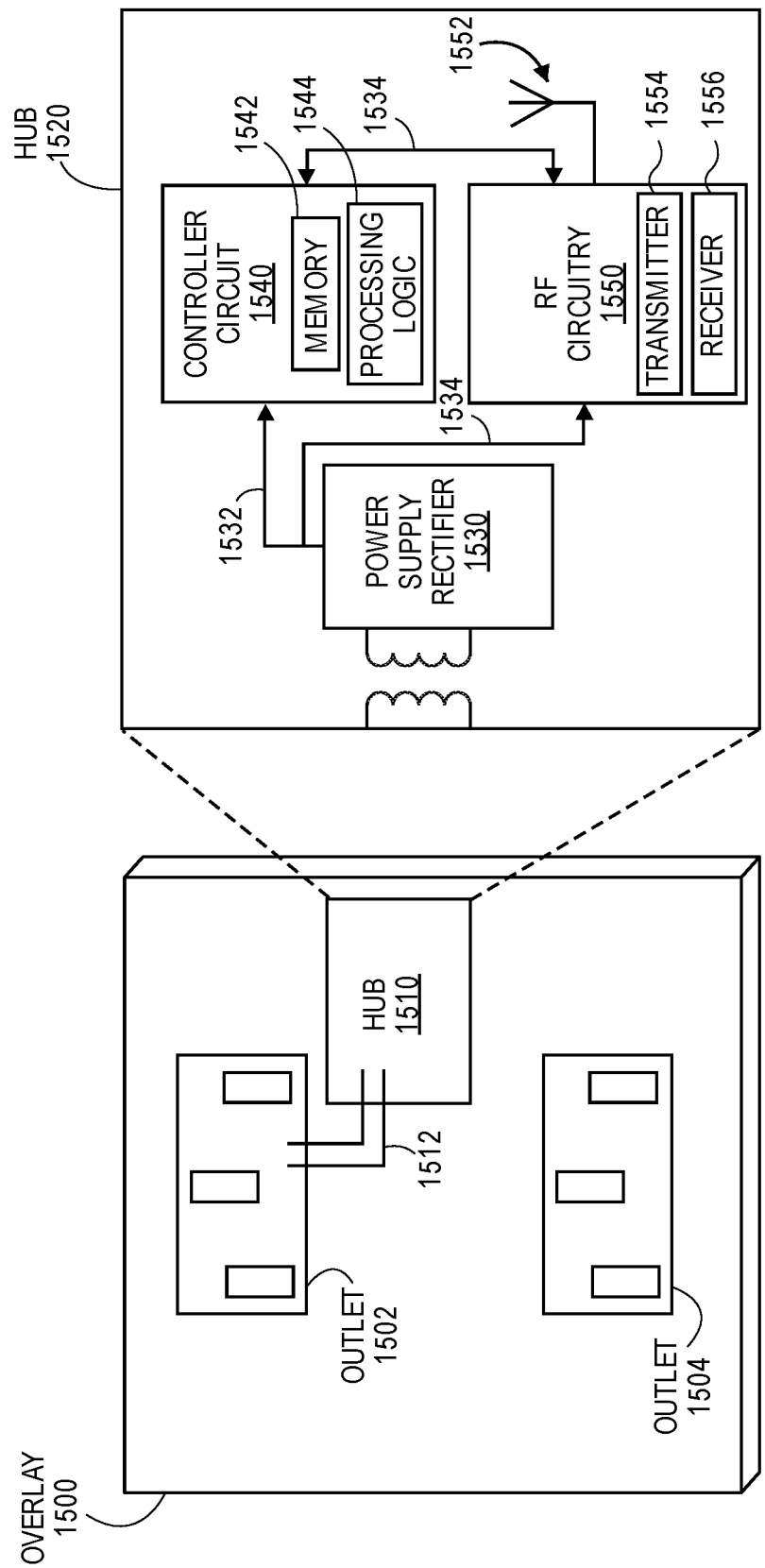

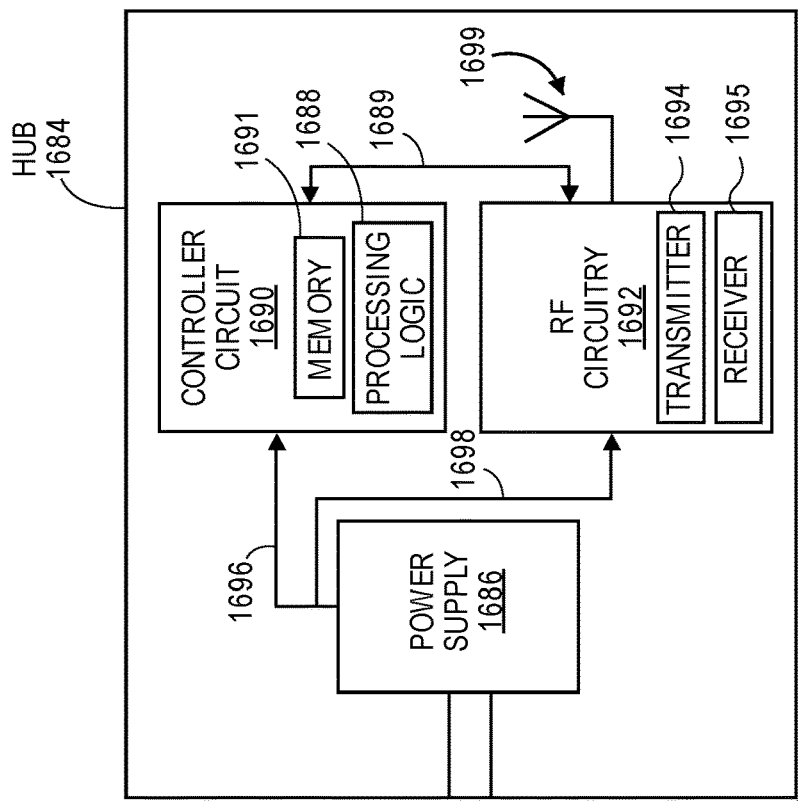
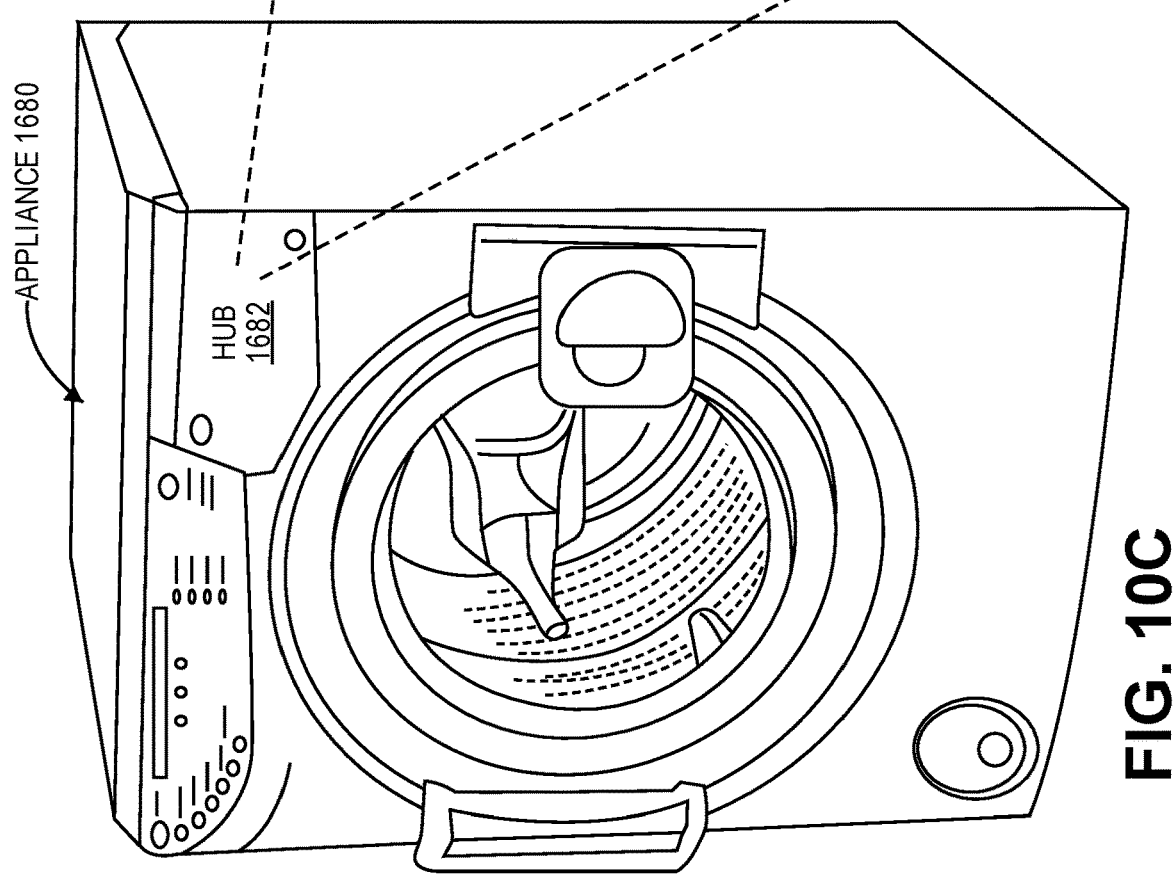
FIG. 10D
FIG. 10C

SYSTEMS AND METHODS FOR PROVIDING COMMUNICATIONS WITH AN IMPROVED NETWORK FRAME STRUCTURE ARCHITECTURE WITHIN WIRELESS SENSOR NETWORKS

RELATED APPLICATIONS

This application is a continuation of U.S. Pat. No. 10,397,872, issued on Aug. 27, 2019, entitled: SYSTEMS AND METHODS FOR PROVIDING COMMUNICATIONS WITH AN IMPROVED NETWORK FRAME STRUCTURE ARCHITECTURE WITHIN WIRELESS SENSOR NETWORKS, the contents of which are incorporated by reference herein.

FIELD

Embodiments of the invention pertain to systems and methods for providing communications with an improved network frame structure architecture within wireless sensor networks.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Prior wireless systems have difficulty in simultaneously achieving low power and low latency for networks with a large number of sensor nodes. Providing each sensor node a dedicated time slot would cause a wait time for a next slot to be too long. Providing each sensor node random access would cause collisions if numerous sensor nodes transmit at the same time.

SUMMARY

For one embodiment of the present invention, systems and methods for providing communications within wireless sensor networks for improved network frame structure for sensor nodes are disclosed herein. In one embodiment, a system includes a hub having one or more processing units and RF circuitry for transmitting and receiving communications in a wireless network architecture. The system also includes a plurality of sensor nodes each having a wireless device with a transmitter and a receiver to enable bi-directional communications with the hub in the wireless network architecture. The one or more processing units of the hub are configured to execute instructions to cause a change from a first power mode of a receiver of a sensor node to a second power mode upon transmitting notifications to the sensor node during a repeated hub broadcasting time slot.

In one example, a sensor node for a wireless network architecture comprises at least one sensor, a memory for storing instructions, and processing logic coupled to the memory and the at least one sensor. The processing logic executes instructions for processing data received from the at least one sensor and for processing communications for the sensor nod. Radio frequency (RF) circuitry is coupled to the processing logic. The RF circuitry includes transmitter and receiver functionality to transmit communications to a hub and to receive communications from the hub in the wireless network architecture. The processing logic is configured to execute instructions to change a first low power mode of the receiver functionality to a second power mode upon receiving communications having control or alarm information from the hub during a repeated hub broadcasting time slot with the control or alarm information originating from the hub or from a group of sensor nodes.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIG. 9A shows an exemplary embodiment of a hub implemented as an overlay 1500 for an electrical power outlet in accordance with one embodiment.

FIG. 9B shows an exemplary embodiment of an exploded view of a block diagram of a hub 1520 implemented as an overlay for an electrical power outlet in accordance with one embodiment.

FIG. 10C shows an exemplary embodiment of a hub implemented within an appliance (e.g., smart washing machine, smart refrigerator, smart thermostat, other smart appliances, etc.) in accordance with one embodiment.

FIG. 10D shows an exemplary embodiment of an exploded view of a block diagram of a hub 1684 implemented within an appliance (e.g., smart washing machine, smart refrigerator, smart thermostat, other smart appliances, etc.) in accordance with one embodiment.

DETAILED DESCRIPTION

Figure 1:
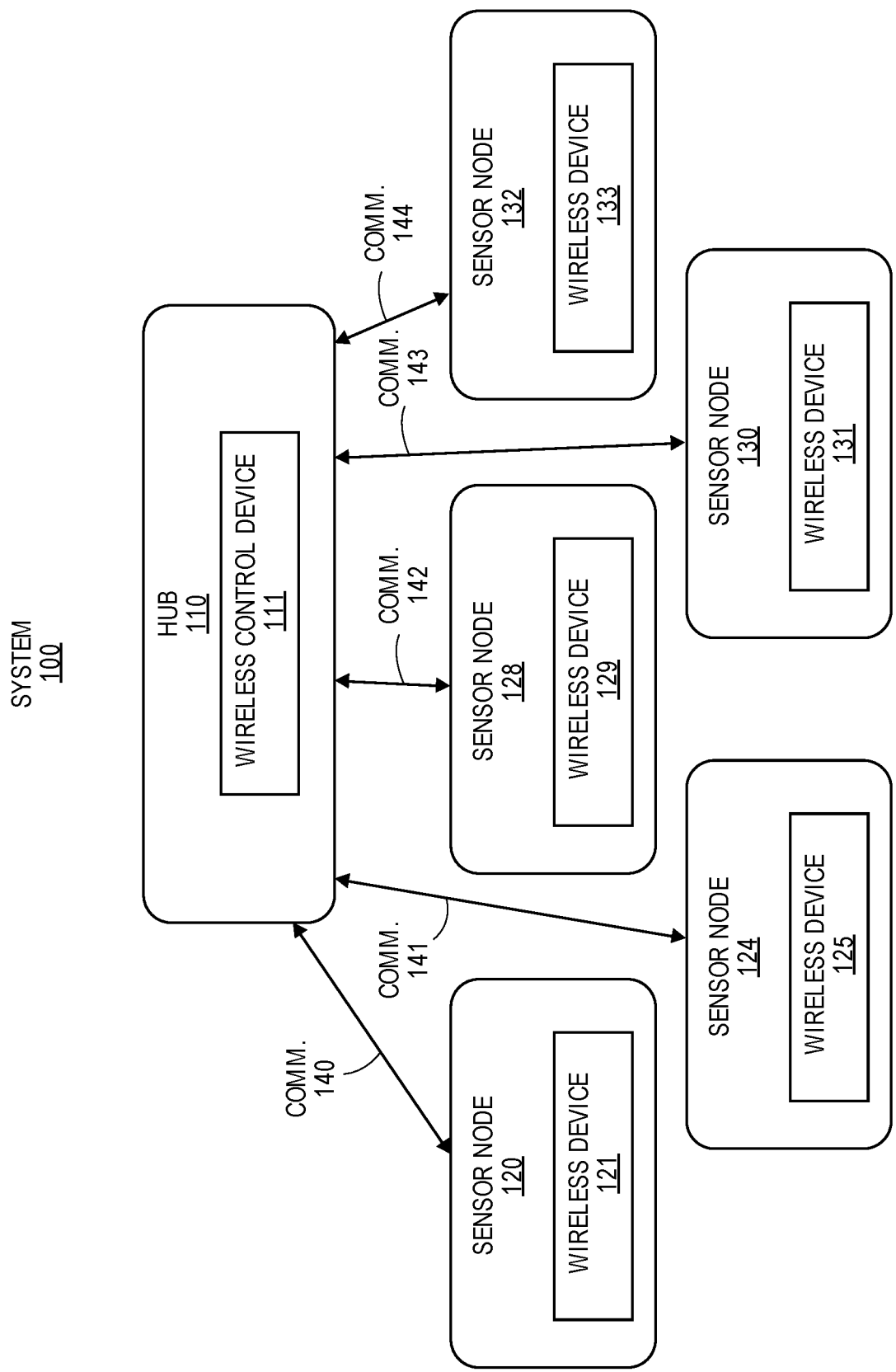
FIG. 1 illustrates an exemplar system of wireless nodes having different length time slots for different types of communications for an improved network frame structure in accordance with one embodiment.

Systems and methods for providing communications within wireless sensor networks with improved network frame structure architecture are disclosed herein. In one embodiment, a system includes a hub having one or more processing units and RF circuitry for transmitting and receiving communications in a wireless network architecture. The system also includes a plurality of sensor nodes each having a wireless device with transmitter functionality and receiver functionality to enable bi-directional communications with the hub in the wireless network architecture. The one or more processing units of the hub are configured to execute instructions to cause a change from a first power mode of the receiver functionality of a sensor node to a second power mode upon transmitting notifications to the sensor node during a repeated hub broadcasting time slot with the notifications originating from the hub or from a different sensor node.

In one example, the notifications originate from the hub or from a different sensor node.

The hub can include RF circuitry that is operable during relevant time periods for receiving and transmitting communications to sensors nodes in wireless networks, particularly in indoor environments. For the purpose of this, indoor environments are also assumed to include near-indoor environments such as in the region around building and other structures, where similar issues (e.g., presence of nearby walls, etc.) may be present.

Wireless networks include a hub and devices that belong to one or more groups of devices (e.g., sensor nodes). Devices are mostly sleeping to save power while the hub always listens for any notifications from the devices. Devices occasionally have to send notifications to the hub and other devices in their own group. Notifications usually appear in bursts. Some devices are more likely than others to have notifications simultaneously. The number of devices is large enough to congest the wireless connection if random access is allowed during a burst. Devices having random access would cause collisions if a large number of devices end up transmitting at the same time. The number of devices is also large enough that dedicated time slots for each device results in a long time between the two slots of a device and thus low latency can not be guaranteed.

Low power and low latency are difficult to achieve simultaneously in networks with a large number of devices (e.g., at least 5 devices, at least 10 devices). A slotted frame structure like 802.15.4 TSCH has large slot length and this is only efficient for data transfer. Small control packets would only use a fraction of the slot making the network throughput very low for applications with a lot of control information mixed with larger data packets.

The present design is targeted for applications in which it is beneficial for a device to be able to communicate to or wake up certain subset of devices from low power mode whenever needed.

The present design includes the following primary improvements: 1) mix of short uplink control slots, downlink forwarding slot and longer data slots 2) control signal suppression enabled by grouping devices.

In one embodiment, an asymmetry in power availability may be exploited to provide long range of communication in a wireless asymmetric network architecture while maintaining long battery life for nodes that are powered by a battery source. In an exemplary embodiment, a communication range of 20 meters between communicating nodes may be achieved while providing a long battery life (e.g., approximately 10 years, at least ten years) in battery operated nodes. This may be achieved by implementing an energy aware networking protocol in accordance with embodiments of this invention. Specifically, a tree-like network architecture having mesh based features may be used where long-life battery operated nodes are used on the terminal ends of the tree.

An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

FIG. 1 illustrates an exemplar system of wireless nodes having different length time slots for different types of communications for an improved network frame structure in accordance with one embodiment. The system 100 primarily has a tree network architecture that is capable of mesh-like network functionality in accordance with one embodiment. The system 100 primarily has a tree network architecture for standard communications (e.g., (e.g., node identification information, notifications, sensor data, node status information, synchronization information, localization information, other such information for the wireless sensor network, time of flight (TOF) communications, etc.). The system 100 includes a hub 110 having a wireless control device 111, a sensor node 120 having a wireless device 121, a sensor node 124 having a wireless device 125, a sensor node 128 having a wireless device 129, a sensor node 130 having a wireless device 131, and a sensor node 132 having a wireless device 133. Additional hubs that are not shown can communicate with the hub 110 or other hubs. Each hub communicates bi-directionally with the sensor nodes 120, 124, 128, 130, and 132. The hubs are also designed to communicate bi-directionally with other devices (e.g., client device, mobile device, tablet device, computing device, smart appliance, smart TV, etc.).

In one embodiment, the control device 111 of the hub 110 is configured to execute instructions to determine different length time slots for different types of communications between the hub and the sensor nodes (e.g., nodes 120, 124, 128, 130, 132). For example, the control device 111 can be configured to determine shorter uplink control time slots, downlink forwarding time slots, and longer data time slots. The hub or sensor node is also configured for suppression of notifications when appropriate due to grouping of sensor nodes.

A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

Figure 2:
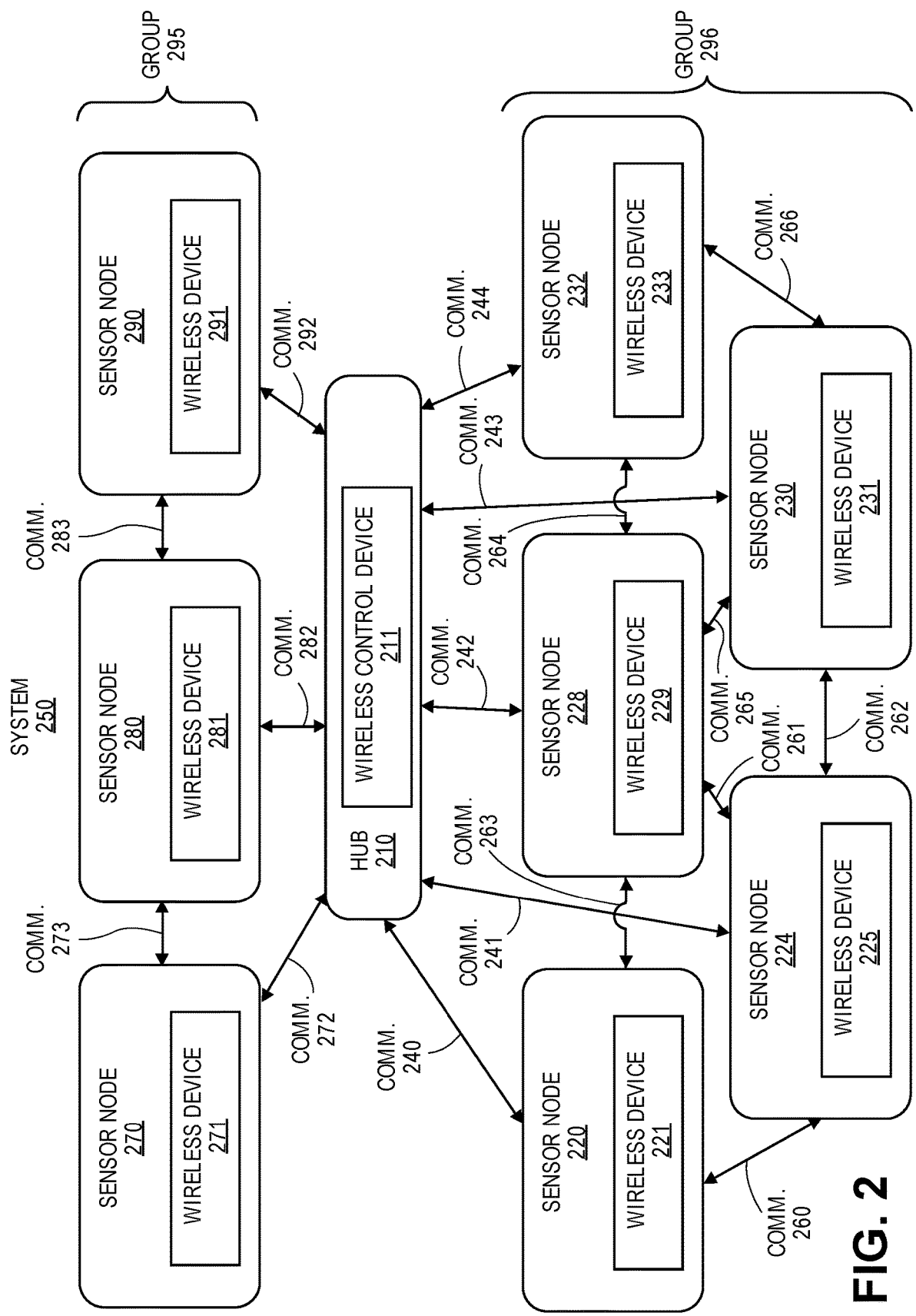
FIG. 2 shows a system primarily having a tree network architecture that is capable of mesh-like network functionality in which sensor nodes can have different length time slots for different types of communications and suppression of notifications when appropriate for an improved network frame structure in accordance with one embodiment.

FIG. 2 shows a system primarily having a tree network architecture that is capable of mesh-like network functionality in which sensor nodes can have different length time slots for different types of communications and suppression of notifications when appropriate for an improved network frame structure in accordance with one embodiment. The system 250 may establish a mesh-like network architecture for determining locations sensor nodes based on a threshold criteria (e.g., movement of at least one node by a certain distance, a change in path length between a node and the hub by a certain distance) being triggered. The system 250 includes a hub 210, a first group 295 of nodes 220, 224, 228, 230, 232 and a second group 296 of nodes 270, 280, and 290. The sensor nodes can be assigned into different groups. In another example, the group 296 is split into a first subgroup of nodes 220 and 224 and a second subgroup of nodes 228, 230, and 232. In one example, each group (or subgroup) is assigned a pseudo random time slot for communicating with other nodes or hubs.

The hub 210 includes the wireless device 211, the sensor node 220 includes the wireless device 221, the sensor node 224 includes the wireless device 225, the sensor node 228 includes the wireless device 229, the sensor node 230 includes the wireless device 231, the sensor node 232 includes the wireless device 233, the sensor node 270 includes the wireless device 271, the sensor node 280 includes the wireless device 281, and the sensor node 290 includes the wireless device 291. Additional hubs that are not shown can communicate with the hub 210 or other hubs. The hub 210 communicates bi-directionally with the sensor nodes.

These communications include bi-directional communications 240-244, 272, 282, and 292 in the wireless asymmetric network architecture. The sensor nodes communicate bi-directionally with each other based on communications 261-266, 273, and 283 to provide the mesh-like functionality for different applications including determining locations of the hub and sensor nodes.

In one embodiment, the control device 211 of the hub 210 is configured to execute instructions to determine different length time slots for different types of communications between the hub and the sensor nodes. For example, the control device 211 can be configured to determine shorter uplink control time slots, downlink forwarding time slots, and longer data time slots. The hub or sensor node is also configured for suppression of notifications when appropriate due to grouping of sensor nodes.

Figure 3:
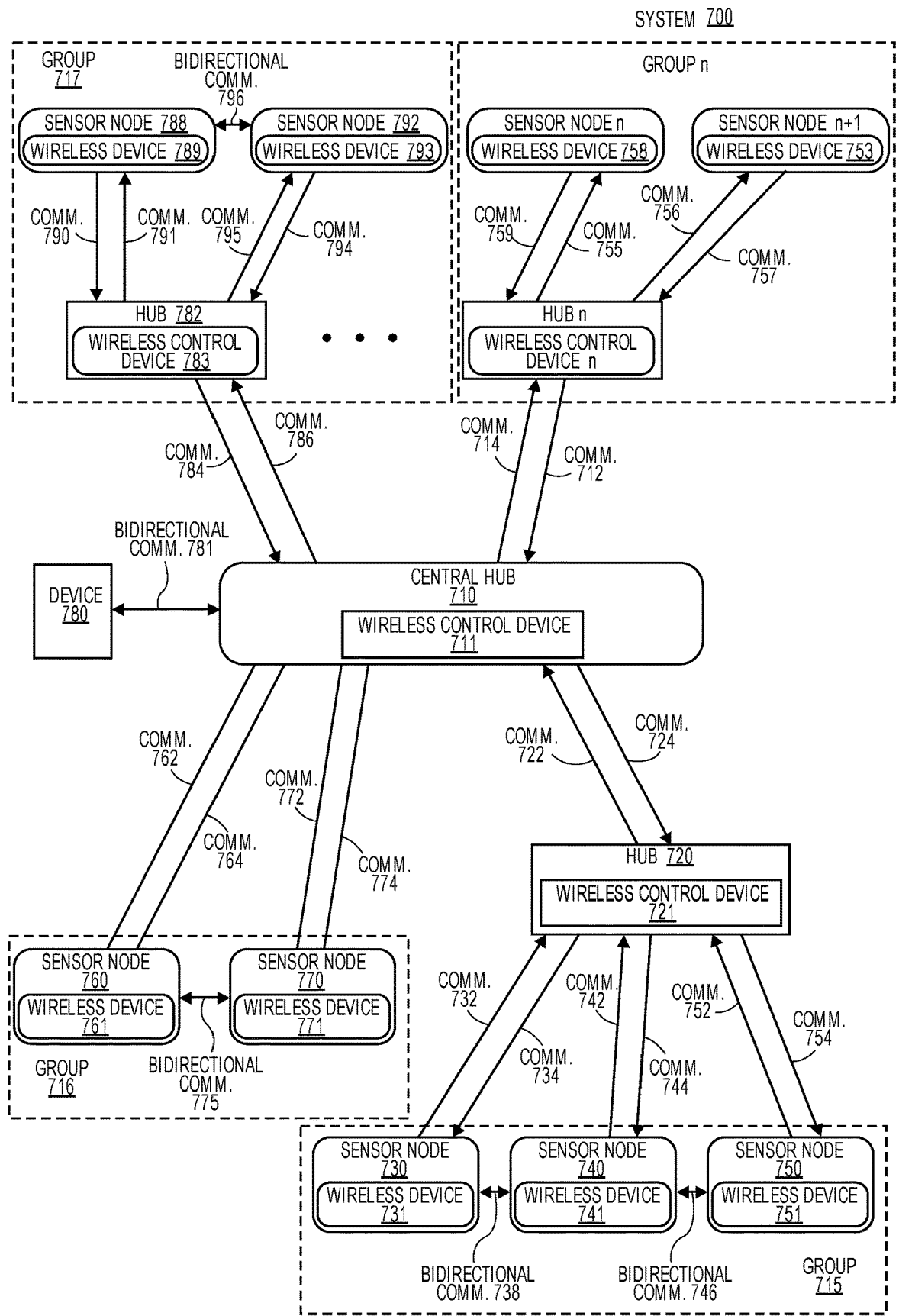
FIG. 3 shows a system with an asymmetric tree and mesh network architecture having multiple hubs in which each group of sensor nodes is assigned a time slot based on a pseudo random algorithm for communicating in accordance with one embodiment.

FIG. 3 shows a system with an asymmetric tree and mesh network architecture having multiple hubs in which each group of sensor nodes is assigned a time slot based on a pseudo random algorithm for communicating in accordance with one embodiment. The system 700 includes a central hub 710 having a wireless control device 711, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including device 780 (e.g., client device, mobile device, tablet device, computing device, smart appliance, smart TV, etc.).

The sensor nodes 730, 740, 750, 760, 770, 788, 792, n, and n+1 (or terminal nodes) each include a wireless device 731, 741, 751, 761, 771, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture including assigning groups of nodes and assigning time slots based on a pseudo random algorithm with different length time slots for different types of communications.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, a central hub (or other hubs) assign nodes 760 and 770 to a group 716, nodes 730, 740, and 750 to a group 715, nodes 788 and 792 to a group 717, and nodes n and n+1 to a group n. In another example, groups 716 and 715 are combined into a single group.

A wireless control device of the central hub, alone or in combination with other hubs, is configured to execute instructions to determine different length time slots for different types of communications between the hub(s) and the sensor nodes. For example, a hub can be configured to determine shorter uplink control time slots, downlink forwarding time slots, and longer data time slots. The hub or sensor node is also configured for suppression of notifications when appropriate (e.g., when certain notifications are not needed or desired).

By using the architectures illustrated in FIGS. 1-3, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 99% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

In one example, in order to save power, sensor nodes configured in a low power mode (e.g., sleeping state) only wake up in a higher power mode and check if a downlink forwarding slot has a communication signal in it. A hub that is typically receiving uplink traffic uses this slot to forward any short group messages it has received. A group identifier in the message tells the receiving sensor nodes which group is supposed to react or stay awake after receiving this message. A sensor node that needs to send a group message uses one of the uplink slots in a randomly determined manner. A random slot can be calculated so that there is very little chance (or none at all) for a collision within one group. This would be beneficial in applications where groups can be formed from sensor nodes that are more likely to transmit control information at the same time. For example, a network that senses space occupancy includes groups of sensor nodes. Each sensor node within a first group is more likely to transmit control information at approximately the same time when occupancy is detected in contrast to a second group of sensor nodes that is not currently sensing occupancy.

In applications in which the main purpose of the control message is to wake up a group of devices and in which the group is more likely to have several devices to wake up at the same time it is not necessary for all devices (e.g., sensor nodes) to transmit the wake up command. The present design includes the concept of signal suppression to reduce congestion of the wireless network. When several devices in a group are trying to send control information these devices use pseudo randomly allocated time slots. While waiting for their transmit time slot these device have operable receive modes to detect any other transmission from the same group. If a transmission from another device of the group is detected, then the device cancels its own future transmission to reduce network congestion for the wireless network. If a control packet of a notification ends up being transmitted by one of the devices in a group, then the confirmation of the successful reception of this control packet or another control packet for any device in this group may be detected in a subsequent downlink broadcast slot. If confirmation is detected, then all devices in the group that receive the confirmation will suppress their future transmissions. Otherwise the device keep repeating transmissions with control packets until the confirmation is detected for at least one transmission.

Figure 4:
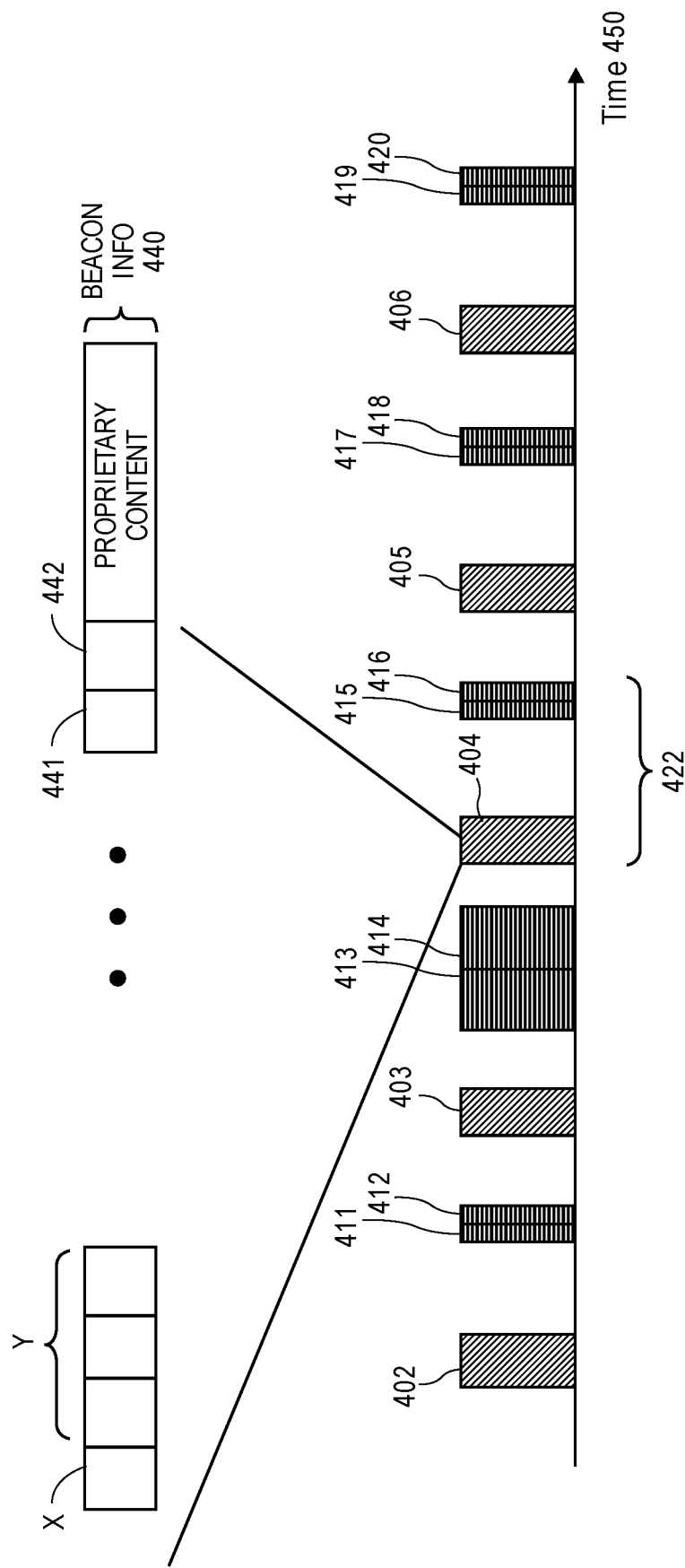
FIG. 4 illustrates a time line having different length time slots for different types of communications for wireless nodes in a wireless network architecture in accordance with one embodiment.

FIG. 4 illustrates a time line having different length time slots for different types of communications for wireless nodes in a wireless network architecture in accordance with one embodiment. A broadcast beacon signal 402-406 is periodically repeated on a time line 450. The broadcast beacon signal may include 1 byte field x indicating to other systems that this is a beacon frame followed by field y that can include information where the frame related information 441 and 442 can be found inside the beacon info 440. Frames like 422 are time slots where hub and nodes can communicate without other systems interfering. During the frames, data, acknowledgment, notifications, beacon, or MAC command packets can be sent.

Defining the frames using a known protocol in the beginning of the beacon before a proprietary content prevents other system from transmitting during the time periods of the guaranteed time slots. In one example, no other system (e.g., IEEE 802.15.4 systems) will transmit during a time period 422 (or other similar periodic time periods) based on including the frame information 441 and 442 at the beginning of every beacon. The frame order field 442 includes information about the length of the frame and the beacon order field 441 includes the information about the time between two frames.

Additional details of a network frame architecture has been described in U.S. patent application Ser. No. 14/925,889 filed on Oct. 28, 2015, which is incorporated by reference in entirety herein.

In one example, a hub utilizes a pseudo random algorithm to determine time slots 411-420 for a first group of sensor nodes. The pseudo random algorithm can define a different length time slot for different types of communications. In one example, devices (e.g., sensor nodes) in a first group have operable transmitters for transmitting notifications (e.g., control information, alarm information) during time slot signals 411, 412, and 415-420. Devices (e.g., sensor nodes) in the first group have operable transmitters for transmitting data communications during longer time slot signals 413-414. Each time slot signal can be partitioned into shorter time slots for multiple sensor nodes.

Figure 5:
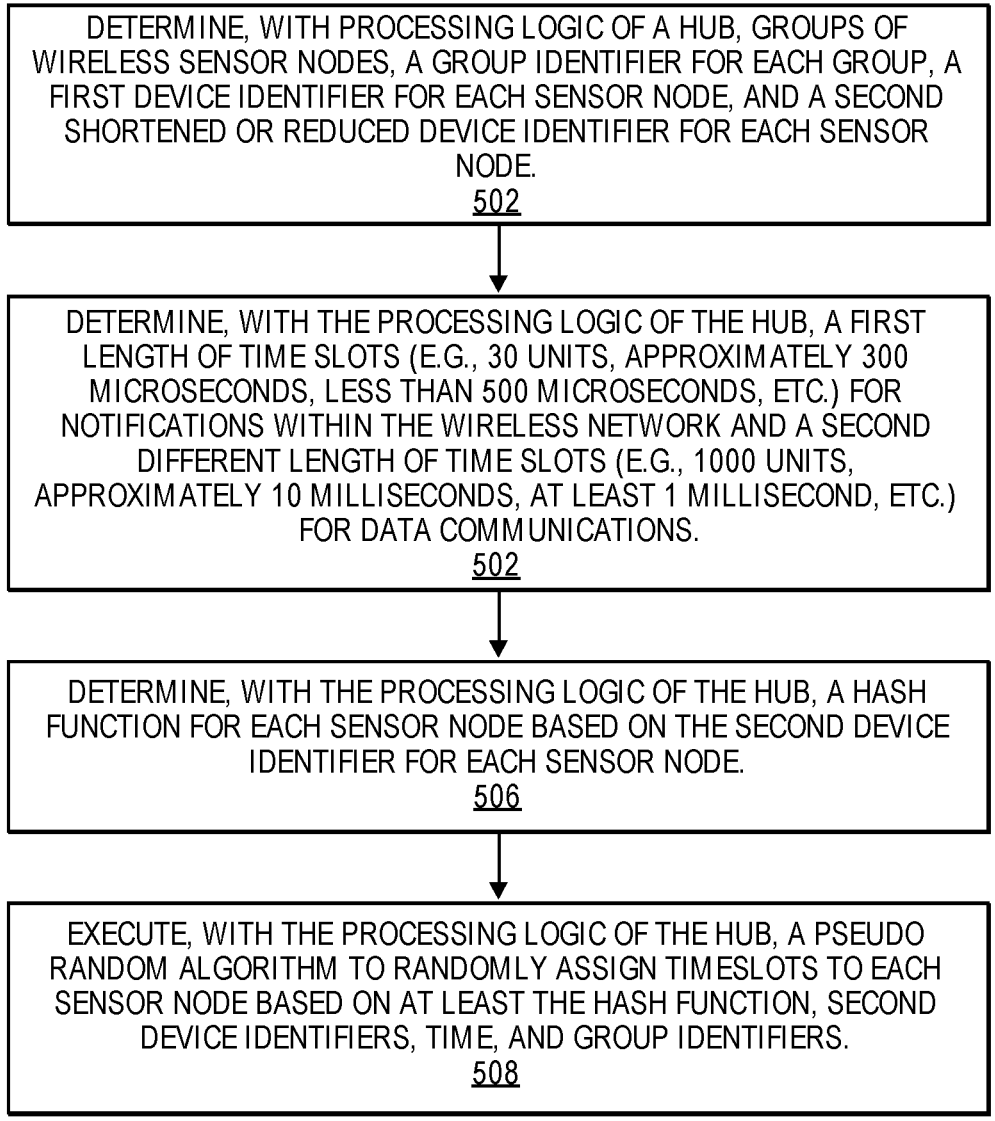
FIG. 5 illustrates a method for determining different length time slots for different types of communications and suppression of notifications when appropriate for an improved network frame structure for wireless sensor nodes in a wireless sensor network in accordance with one embodiment.

FIG. 5 illustrates a method for determining different length time slots for different types of communications and suppression of notifications when appropriate for an improved network frame structure for wireless sensor nodes in a wireless sensor network in accordance with one embodiment. The operations of method 500 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, an anchor node, hub, or a wireless device performs the operations of method 500.

A wireless network architecture having a plurality of wireless nodes and at least one hub is initialized at operation 501. Initialization may include determining locations of each of the plurality of wireless nodes.

At operation 502, processing logic of a hub determines groups of wireless sensor nodes, a group identifier for each group, a first device identifier for each sensor node, and a second shortened or reduced device identifier for each sensor node. At operation 504, the processing logic of the hub determines a first length of time slots (e.g., 30 units, approximately 300 microseconds, less than 500 microseconds, etc.) for notifications within the wireless network and a second different length of time slots (e.g., 1000 units, approximately 10 milliseconds, at least 1 millisecond, etc.) for data communications. In one example, wireless network is optimized for notifications with first length of time slots (e.g., 30 units, approximately 300 microseconds, less than 500 microseconds, etc.) for a first time period and the second different length of time slots (e.g., 1000 units, approximately 10 milliseconds, at least 1 millisecond, etc.) for data communications for a second time period. The hub can switch between the first and second length of time slots depending on a particular application for the wireless sensor network.

At operation 506, the processing logic of the hub determines a hash function for each sensor node based on the second device identifier for each sensor node. The hub can assign the shortened device identifier in a way such that the hash function that is based on the short device identifier can effectively spread the uplink packets across all available time slots.

At operation 508, the processing logic of the hub executes a pseudo random algorithm to randomly assign time slots to each sensor node based on at least the hash function, second device identifiers, time, and group identifiers. A pseudo random time slot is designed based on sensor nodes in a group being less likely to have a same time slot compared to other sensor nodes in the same group while sensor nodes in different groups being more likely to occupy a same time slot.

In one example, a triggering event sensed by the wireless sensor network, causes an alarm signal to be generated and this alarm signal should be reliably delivered, which requires a retransmission mechanism. An alarm signal can be transmitted from multiple sensor nodes at the same time, and thus a large number of uplink alarm micro time slots are needed. A retransmission mechanism that relies on unicast can increase the micro time slot size, which limits the number of uplink alarm micro time slots.

In one example, an alarm signal is a per constellation (e.g., per group) control packet. As the number of constellation increases, a TDMA system will require a larger number of downlink alarm time slots, which is not scalable. Further since multiple downlink alarm time slots forces the sensor nodes to have active receive modes for more time slots to receive alarm packets, this causes an increase in the active duration of a RF module of the sensor node.

Figure 6:
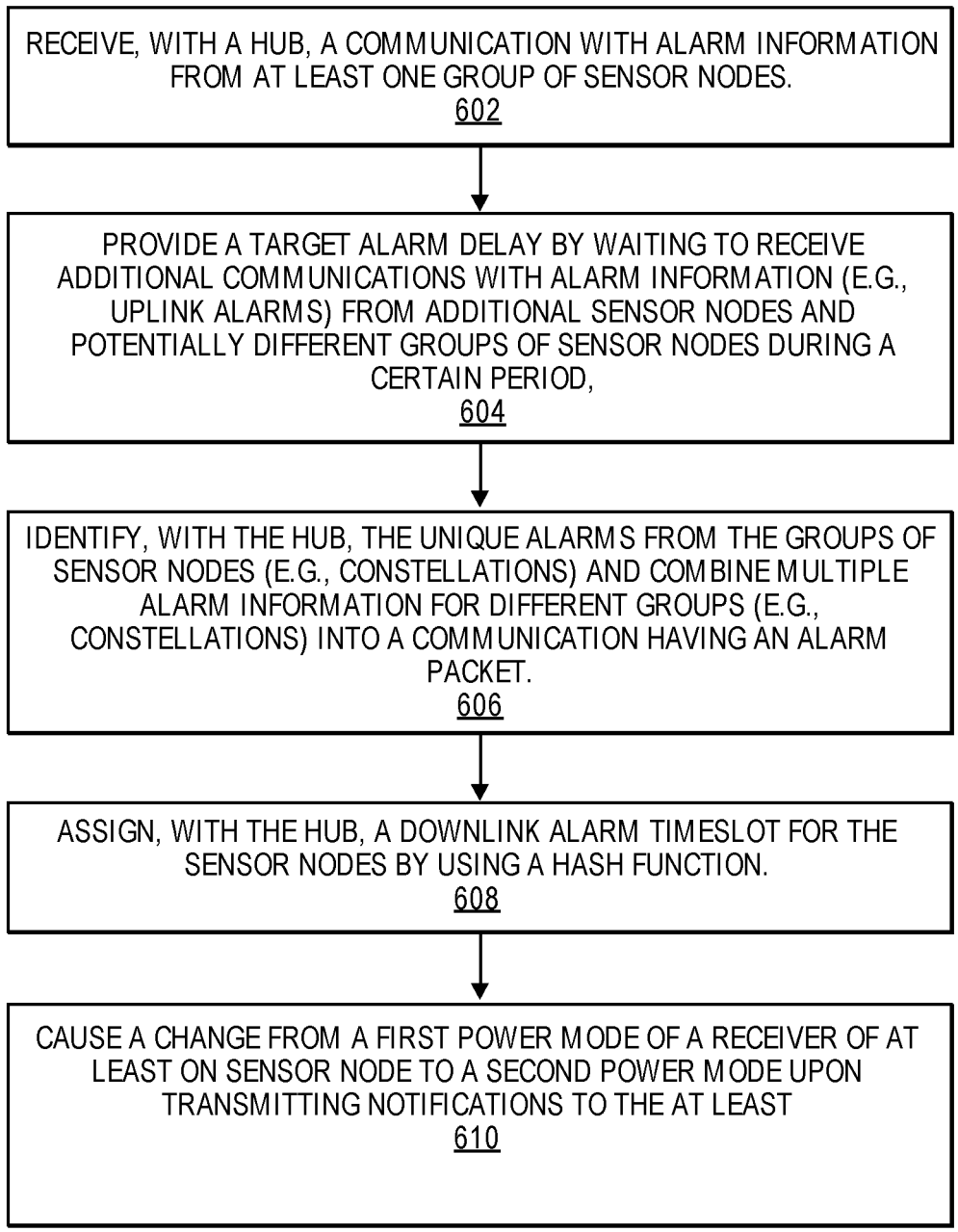
FIG. 6 illustrates a method for scalable and energy efficient downlink alarm delivery in accordance for wireless sensor nodes in a wireless sensor network in accordance with one embodiment.

Therefore, the present design provides a scalable and energy efficient way of downlink alarm delivery. FIG. 6 illustrates a method for scalable and energy efficient downlink alarm delivery in accordance for wireless sensor nodes in a wireless sensor network in accordance with one embodiment. The operations of method 600 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a node, hub, or a wireless device performs the operations of method 600.

At operation 602, a hub receives a communication with alarm information from at least one group of sensor nodes. At operation 604, the hub provides a target alarm delay by waiting to receive additional communications with alarm information (e.g., uplink alarms) from additional sensor nodes and potentially different groups of sensor nodes during a certain period.

Then, at operation 606, the hub identifies the unique alarms from the groups of sensor nodes (e.g., constellations) and combines multiple alarm information for different groups of sensor nodes (e.g., constellations) into a communication having an alarm packet. In one example, a first group of sensor nodes transmits first alarm information to the hub and a second group of sensor nodes transmits second alarm information to the hub. At operation 608, the hub assigns a downlink alarm time slot that each sensor node needs to receive while in an active receive mode. The hub can assign the downlink alarm time slot to the sensor node by using a hash function (e.g., y=f (constellation id)).

At operation 610, the hub is configured to execute instructions to cause a change from a first power mode of a receiver of at least one sensor node to a second power mode upon transmitting notifications to the at least one sensor node during a repeated hub broadcasting time slot with the notifications originating from the hub or from a different sensor node. The sensor nodes may need to have a second power mode (e.g., an active receive mode).

Figure 7:
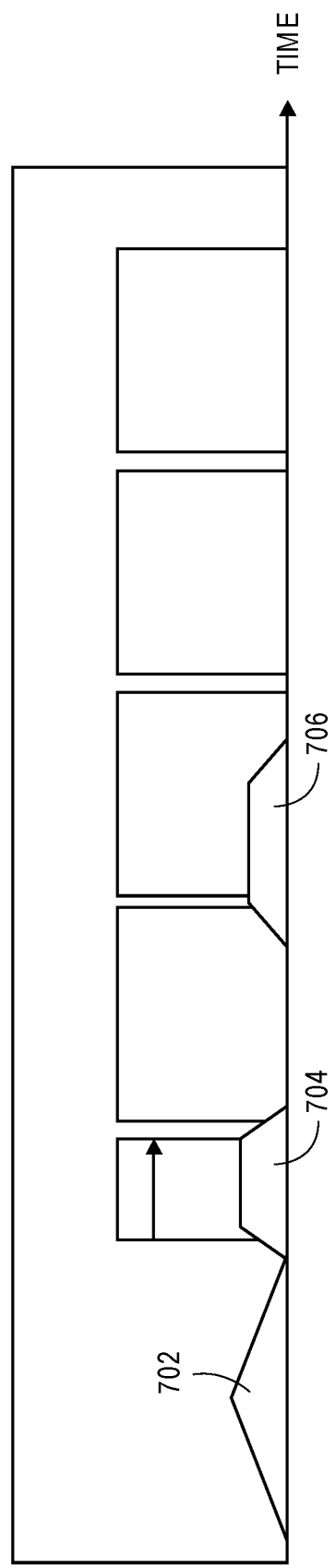
FIG. 7 illustrates a timeline having a scalable and energy efficient way of downlink alarm delivery for wireless nodes in a wireless network architecture in accordance with one embodiment.

FIG. 7 illustrates a timeline having a scalable and energy efficient way of downlink alarm delivery for wireless nodes in a wireless network architecture in accordance with one embodiment. A broadcast beacon signal 702 is periodically repeated on a time line 700. The broadcast beacon signal may include 1 byte field indicating to other systems that this is a beacon frame followed by other fields that can include other information. An aggregated alarm signal 704 can include alarm information from multiple sensor nodes and multiple groups of sensors. The hub removes device identifiers for the alarm information and adds group identifiers to the alarm information. The sensors nodes can monitor the alarm information of the aggregated alarm information to identify a relevant group identifier for a particular sensor node. The signal 706 can include additional aggregated alarm information for a different group identifier or the signal 706 can be a different type of control packet. For example, aggregating multiple information can be used for other control packets such as capturing images with the sensor nodes, obtaining images and deleting images, etc.

In one example, the aggregated alarm signal 704 includes alarm information for groups 1-4 and aggregate alarm signal 706 includes alarm information for groups 5-8.

The present design provides an alarm retransmission mechanism by utilizing a detected forwarded alarm signal as an acknowledgement. After sending a broadcast alarm signal, a sensor node that transmits the alarm signal waits for a next alarm slot to check if the transmitted alarm signal has been forwarded or not (e.g., forwarded by a hub). If the sensor node can receive the forwarded alarm signal, then this indicates that the hub received the alarm signal, which does not trigger a retransmission of the alarm signal. Otherwise, the sensor node retransmits the alarm signal regarding such case as no alarm delivery from the sensor node to the hub.

In one example, a sensor node detects a triggering event that causes the sensor node to generate and transmit an alarm signal during a next randomly determined time slot. The hub receives the alarm signal and determines an action (e.g., repeating the alarm signal which causes all nodes to wake, causing an alarm signal to be sent to a home owner, police station, fire station, ambulance, etc.) based on receiving the alarm signal. Upon waking other sensor nodes, the hub may receive additional communications from other sensors. The hub can then determine an appropriate action based on the additional communications. For example, all sensors after receiving a wake signal from the hub may capture images and transmit the images to the hub for analysis.

In one example, retransmission of data is based on whether an acknowledgement communication is detected. To reduce length of time slot, carrier sensing and backoff slot inside time slot are not appropriate.

Therefore, the present design reduces the chance of collision during uplink packet transmission from multiple nodes by spreading out the uplink packets from sensor nodes to hub(s) across all available time slots. The present design utilizes randomness for time slot selection.

Figure 8:
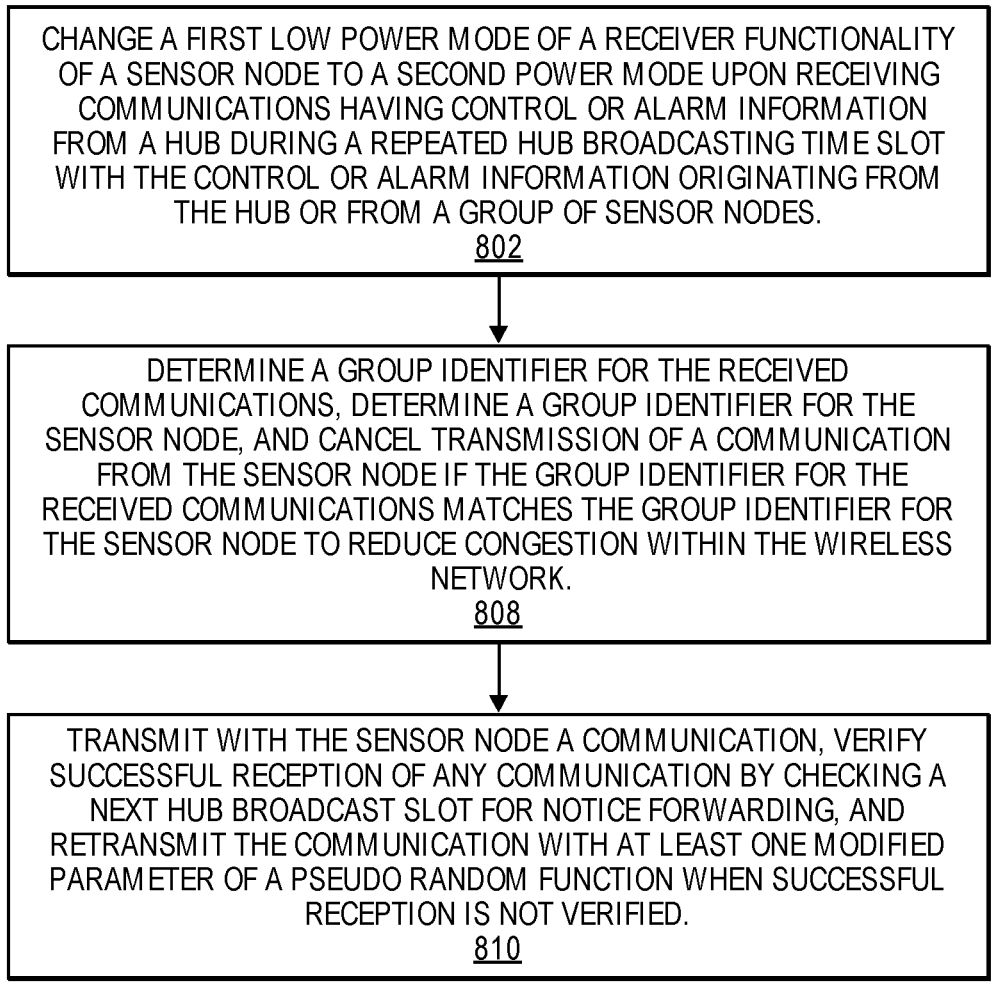
FIG. 8 illustrates a method for operating sensor nodes in an energy efficient manner in a wireless sensor network in accordance with one embodiment.

FIG. 8 illustrates a method for operating sensor nodes in an energy efficient manner in a wireless sensor network in accordance with one embodiment. The operations of method 800 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a sensor node or wireless device performs the operations of method 800.

At operation 802, processing logic of a sensor node is configured to change a first low power mode of a receiver functionality of the sensor node to a second power mode upon receiving communications having control or alarm information or alarm information from a hub during a repeated hub broadcasting time slot with the control or alarm information originating from the hub or from a group of sensor nodes. The receiver functionality of the sensor node is configured at a minimum level of power to listen to broadcast messages (e.g., only operable receiver functionality) during the first power mode and operable during the second power mode at any level above the minimum level of power including having operable transmitter functionality.

At operation 808, the processing logic of the sensor node is configured to execute instructions to determine a group identifier for the received communications, to determine a group identifier for the sensor node, and to cancel transmission of a communication from the sensor node if the group identifier for the received communications matches the group identifier for the sensor node to reduce congestion within the wireless network.

In one example, a group of sensor nodes is formed to increase a likelihood that the sensor nodes of the group will transmit communications at approximately the same time or close in time.

At operation 810, the processing logic of the sensor node is configured to execute instructions to transmit a communication, to verify successful reception of any communication by checking a next hub broadcast slot for notice forwarding, and to retransmit the communication with at least one modified parameter of a pseudo random function when successful reception is not verified.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs may be implemented in a variety of ways including narrow-band, channel overlapping, channel stepping, multi-channel wide band, and ultra-wide band communications.

The hubs may be physically implemented in numerous ways in accordance with embodiments of the invention. FIG. 9A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 9B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 10B:
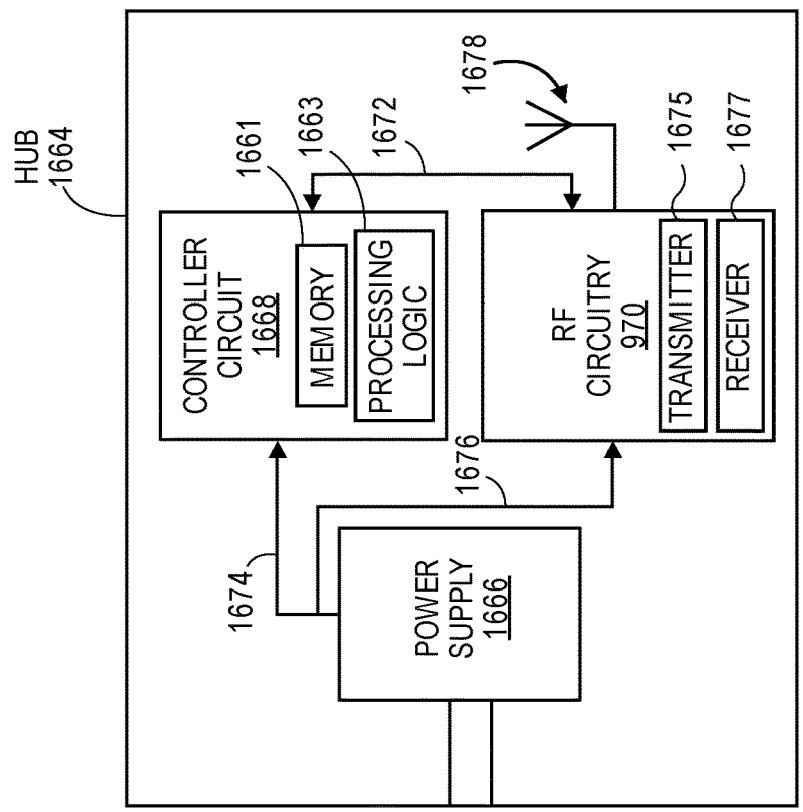
FIG. 10B shows an exemplary embodiment of a block diagram of a hub 1664 implemented as a card for deployment in a computer system, appliance, or communication hub in accordance with one embodiment.
Figure 10A:
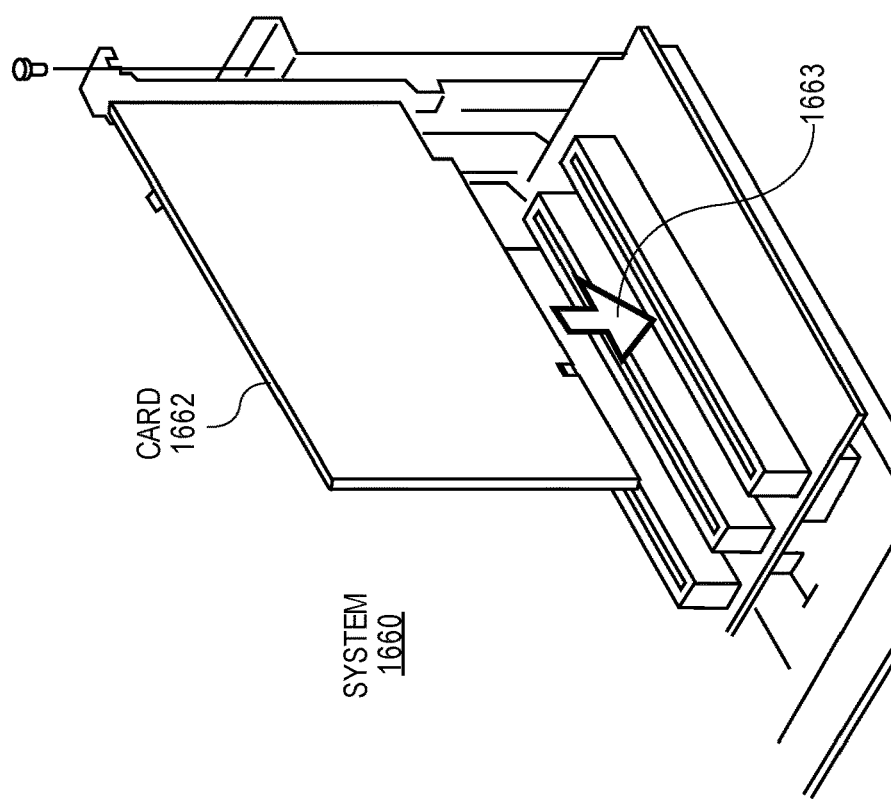
FIG. 10A shows an exemplary embodiment of a hub implemented as a card for deployment in a computer system, appliance, or communication hub in accordance with one embodiment.

FIG. 10A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 10B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and communicating within the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

FIG. 10C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 10D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuity 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture. The one or more processing units are configured to execute instructions to receive at least one communication with alarm information from at least one group of sensor nodes and to provide a target alarm delay by waiting to receive additional communications with alarm information from additional sensor nodes and potentially different groups of sensor nodes during a certain period.

In one example, the one or more processing units of the apparatus are configured to execute instructions to identify unique alarms from the at least one communications received from the at least one group of sensor nodes.

In another example, the one or more processing units of the apparatus are configured to execute instructions to combine multiple alarm information of the unique alarms for different groups of sensor nodes into a communication having an alarm packet.

In another example, the one or more processing units of the apparatus are configured to execute instructions to receive a first plurality of communications having first alarm information from a first group of sensor nodes and to receive a second plurality of communications having second alarm information from a second group of sensor nodes.

In another example, the one or more processing units of the apparatus are configured to execute instructions to assign a downlink alarm time slot for the alarm packet to be transmitted to the sensor nodes by using a hash function.

In another example, the one or more processing units of the apparatus are configured to execute instructions to cause a change from a first power mode of a receiver of a sensor node to a second power mode upon transmitting the alarm packet with the alarm information to the sensor node during a repeated hub broadcasting time slot.

Various batteries could be used in the wireless sensor nodes, including lithium-based chemistries such as Lithium Ion, Lithium Thionyl Chloride, Lithium Manganese Oxide, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 11:
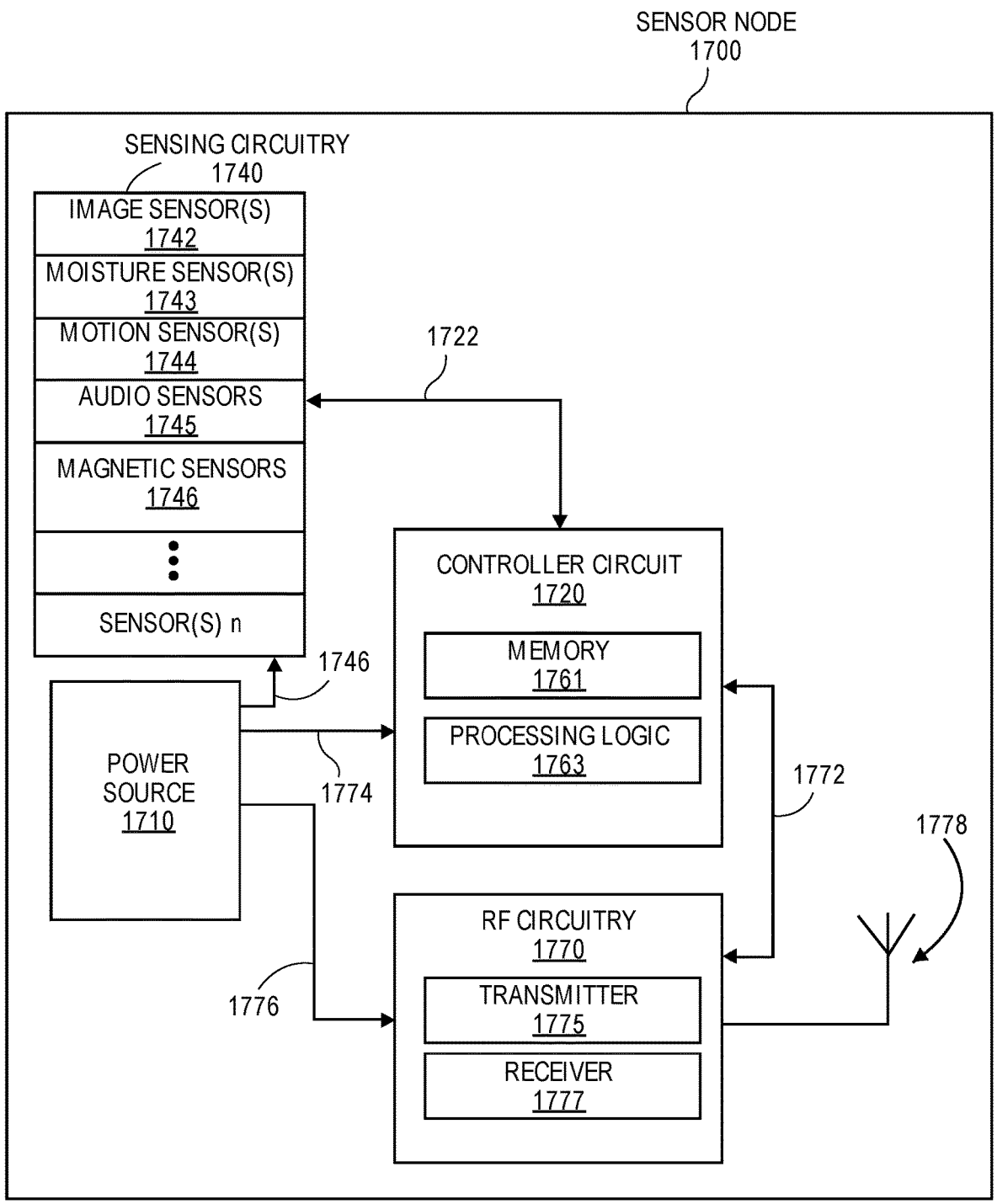
FIG. 11 illustrates a block diagram of a sensor node in accordance with one embodiment.

FIG. 11 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

In one embodiment, a sensor node for a wireless network architecture includes at least one sensor, a memory for storing instructions, processing logic coupled to the memory and the at least one sensor. The processing logic executes instructions for processing data received from the at least one sensor and for processing communications for the sensor node. The sensor node includes radio frequency (RF) circuitry that is coupled to the processing logic. The RF circuitry includes transmitter and receiver functionality to transmit communications to a hub and to receive communications from the hub in the wireless network architecture. The processing logic is configured to execute instructions to processing logic is configured to execute instructions to change a first low power mode of the receiver functionality to a second power mode upon receiving communications having control or alarm information from the hub during a repeated hub broadcasting time slot with the control or alarm information originating from the hub or from a group of sensor nodes.

In one example, the control or alarm information originates from the hub or from a group of sensor nodes.

In another example, the receiver functionality of the sensor node is configured to be at a minimum level of power to listen to broadcast messages (e.g., only have operable receiver functionality) during the first power mode and operable during the second power mode at any level above the minimum level of power including having operable transmitter functionality.

In another example, the processing logic is configured to execute instructions to determine a group identifier for the received communications, to determine a group identifier for the sensor node, and to cancel transmission of a communication from the sensor node if the group identifier for the received communications matches the group identifier for the sensor node to reduce congestion within the wireless network.

In another example, the group of sensor nodes is formed to increase a likelihood that the sensor nodes of the group will transmit communications at approximately the same time or close in time.

In another example, the sensor node operates with a battery source.

In another example, the processing logic is configured to execute instructions to transmit a communication, to verify successful reception of any communication by checking a next hub broadcast slot for notice forwarding, and to retransmit the communication with at least one modified parameter of a pseudo random function when successful reception is not verified.

In one example, the sensor node is configured to execute instructions to detect at least one of energy of the transmission and a preamble of the transmission to ascertain the transmission without consuming power to process data of the transmission.

Figure 12:
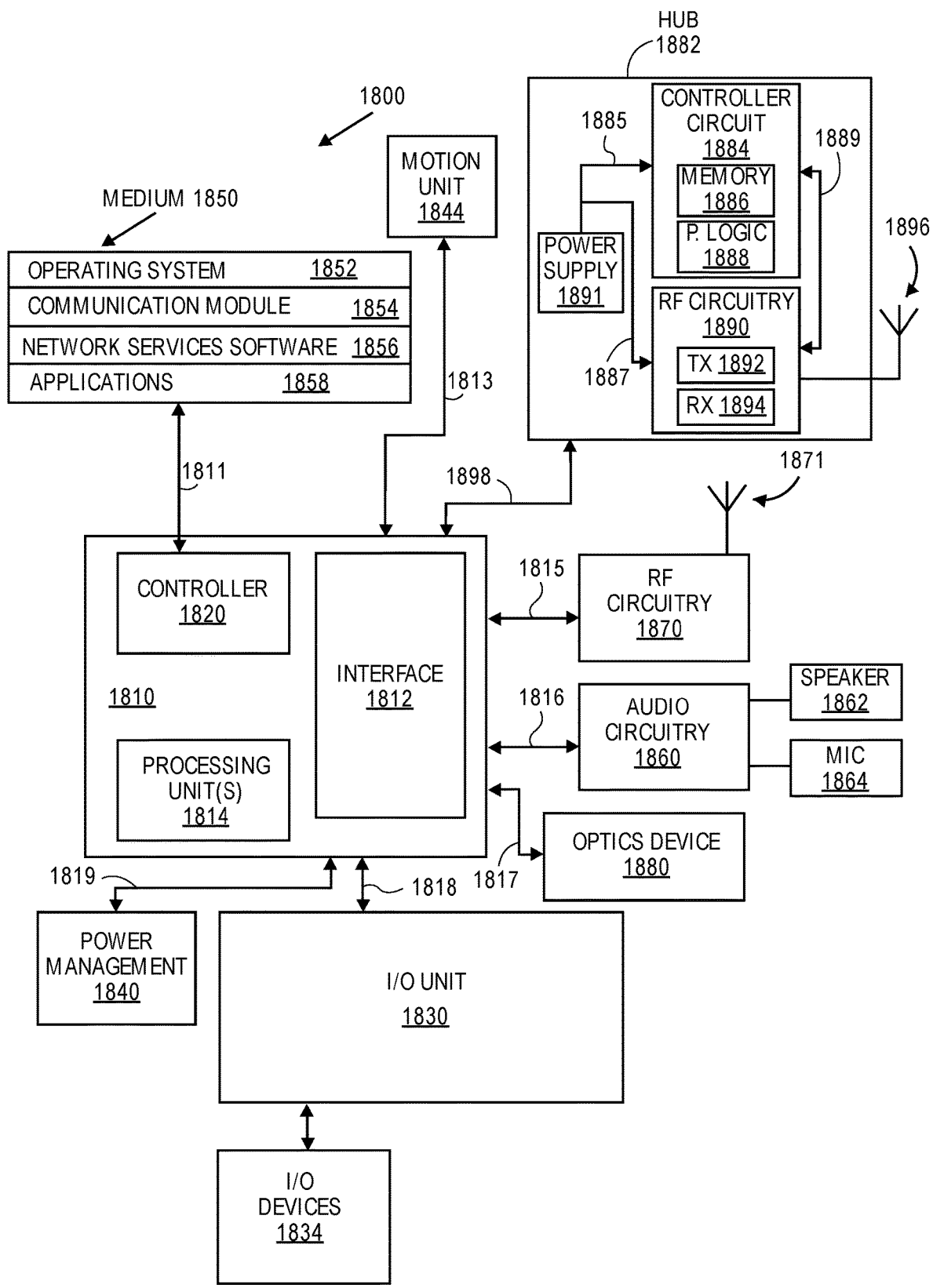
FIG. 12 illustrates a block diagram of a system or appliance 1800 having a hub in accordance with one embodiment.

FIG. 12 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

In one embodiment, a system includes a hub having one or more processing units and RF circuitry for transmitting and receiving communications in a wireless network architecture of a wireless network and a plurality of sensor nodes each having a wireless device with transmitter functionality and receiver functionality to enable bi-directional communications with the hub in the wireless network architecture. The one or more processing units of the hub are configured to execute instructions to cause a change from a first power mode of a receiver of a sensor node to a second power mode upon transmitting notifications to the sensor node during a repeated hub broadcasting time slot.

In one example, the notifications originate from the hub or from a different sensor node. The receiver functionality of the sensor node is configured at a minimum level of power to listen to broadcast messages during the first power mode and operable during the second power mode at any level above the minimum level of power including having operable transmitter functionality.

In another example, the sensor node is configured to execute instructions to determine a group identifier for the received notifications, to determine a group identifier for the sensor node, and to cancel transmission of a communication from the sensor node if the group identifier for the received notifications matches the group identifier for the sensor node to reduce congestion within the wireless network.

In another example, the sensor node is configured to execute instructions to transmit a notification, to verify successful reception of any notification of a group of nodes by checking a next hub broadcast slot for notice forwarding, and to retransmit the notification with at least one modified parameter of a pseudo random function when successful reception is not verified.

In another example, the one or more processing units of the hub are configured to execute instructions to determine transmission time slots for the plurality of sensor nodes using a pseudo random slot location based on sensor nodes in a group being less likely to have a same time slot compared to other sensor nodes in the group while sensor nodes in different groups being more likely to occupy a same time slot.

In another example, the one or more processing units of the hub are configured to execute instructions to determine a first length of time slots for notifications within the wireless network and a second length of time slots for data communications.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system, comprising:
    a hub having one or more processing units and RF circuitry for transmitting and receiving communications in a wireless network architecture of a wireless network; and
    a plurality of sensor nodes each having a wireless device with transmitter functionality and receiver functionality to enable bi-directional communications with the hub in the wireless network architecture, wherein the one or more processing units of the hub are configured to execute instructions to determine a first time length for a notification time slot for transmitting a notification including a control packet from a sensor node to the hub during the notification time slot and to determine a second different time length for a data time slot for transmitting a data communication from the sensor node to the hub during the data time slot.

2. The system of claim 1, wherein notifications originate from the hub or from a different sensor node.

3. The system of claim 2, wherein the receiver functionality of the sensor node is configured at a first level of power to listen to broadcast messages while transmitter functionality is not operable during a first power mode and the receiver functionality is operable during a second power mode at a second level of power with operable transmitter functionality.

4. The system of claim 3, wherein the sensor node is configured to execute instructions to determine a group identifier for the received notifications, to determine a group identifier for the sensor node, and to avoid transmission of a communication from the sensor node if the group identifier for the received notifications matches the group identifier for the sensor node to reduce congestion within the wireless network.

5. The system of claim 1, wherein the sensor node is configured to execute instructions to transmit a notification, to verify successful reception of any notification of a group of nodes by checking a next hub broadcast slot for notice forwarding, and to retransmit the notification with at least one modified parameter of a pseudo random function when successful reception is not verified.

6. The system of claim 1, wherein the one or more processing units of the hub are configured to execute instructions to determine transmission time slots for the plurality of sensor nodes using a pseudo random slot time allocation based on sensor nodes in a group being less likely to have a same time slot compared to other sensor nodes in the group while sensor nodes in different groups being more likely to occupy a same time slot.

7. The system of claim 1, wherein the first length of time slots for notifications is less than 500 microseconds and the second length of time slots for data communications is at least 1 millisecond.

8. An apparatus, comprising:
    a memory for storing instructions;
    one or more processing units to execute instructions for monitoring a plurality of sensor nodes in a wireless network architecture; and
    radio frequency (RF) circuitry to transmit communications to and receive communications from the plurality of sensor nodes each having a wireless device with a transmitter and a receiver to enable bi-directional communications with the RF circuitry of the apparatus in the wireless network architecture, wherein the one or more processing units of the apparatus are configured to execute instructions to receive a first communication with first alarm information from a first group of sensor nodes, to receive a second communication with second alarm information from a second group of sensor nodes, to generate an aggregated alarm packet having the first alarm information and the second alarm information, and to receive a third communication with the first alarm information from the first group of sensor nodes when the first group of sensor nodes does not receive the aggregated alarm packet from the apparatus.

9. The apparatus of claim 8, wherein the one or more processing units of the apparatus are configured to execute instructions to identify unique alarms from the first alarm information and the second alarm information.

10. The apparatus of claim 9, wherein the one or more processing units of the apparatus are configured to execute instructions to transmit the aggregated alarm packet to the first and second group of sensor nodes.

11. The apparatus of claim 10, wherein the first group of sensor nodes does not retransmit the first alarm information with the third communication when the first group of sensor nodes does receive the aggregated alarm packet from the apparatus.

12. The apparatus of claim 11, wherein the one or more processing units of the apparatus are configured to execute instructions to assign a downlink alarm time slot for the aggregated alarm packet to be transmitted to the sensor nodes by using a hash function.

13. The apparatus of claim 12, wherein the one or more processing units of the apparatus are configured to execute instructions to cause a change from a first power mode of a receiver of a sensor node to a second power mode upon transmitting the alarm packet with the alarm information to the sensor node during a repeated hub broadcasting time slot.

14. A sensor node for a wireless network architecture, comprising:
   at least one sensor;
   a memory for storing instructions;
   processing logic coupled to the memory and the at least one sensor, the processing logic to execute instructions for processing data received from the at least one sensor and for processing communications for the sensor node; and
   radio frequency (RF) circuitry coupled to the processing logic, the RF circuitry includes transmitter and receiver functionality to transmit communications to a hub and to receive communications from the hub in the wireless network architecture, wherein the processing logic of the sensor node is configured to receive information from the hub specifying a first time length for a notification time slot for transmitting a notification including a control packet from the sensor node to the hub during the notification time slot and to determine a second different time length for a data time slot for transmitting a data communication from the sensor node to the hub during the data time slot.

15. The sensor node of claim 14, wherein the notifications include control, alarm, or forwarding packets that originate from the hub or from a group of sensor nodes.

16. The sensor node of claim 14, wherein the receiver functionality of the sensor node is configured at a first level of power to listen to broadcast messages during a first power mode and operable during a second power mode at a second level of power with operable transmitter functionality.

17. The sensor node of claim 14, wherein the processing logic is configured to execute instructions to determine a group identifier for the received communications, to determine a group identifier for the sensor node, and to avoid transmission of a communication from the sensor node if the group identifier for the received communications matches the group identifier for the sensor node to reduce congestion within the wireless network.

18. The sensor node of claim 17, wherein a group of sensor nodes is formed to increase a likelihood that the group of sensor nodes will transmit communications at approximately the same time or close in time.

19. The sensor node of claim 14, wherein the first length of time slots for notifications is less than 500 microseconds and the second length of time slots for data communications is at least 1 millisecond.

20. The sensor node of claim 14, wherein the processing logic is configured to execute instructions to transmit a communication, to verify successful reception of any communication by checking a next hub broadcast slot for notice forwarding, and to retransmit the communication with at least one modified parameter of a pseudo random function when successful reception is not verified.

* * * * *